United States Patent
Rogers et al.

(10) Patent No.: US 9,489,861 B2
(45) Date of Patent: Nov. 8, 2016

(54) RYTHMIC MOTOR SKILLS TRAINING DEVICE

(71) Applicants: Gerald Rogers, Dallas, TX (US); Agustin J. Membreno, Plano, TX (US)

(72) Inventors: Gerald Rogers, Dallas, TX (US); Agustin J. Membreno, Plano, TX (US)

(73) Assignee: Dextar Incorporated, Dallas, TX (US)

( * ) Notice: Subject to any disclaimer, the term of this patent is extended or adjusted under 35 U.S.C. 154(b) by 0 days.

(21) Appl. No.: 14/503,834

(22) Filed: Oct. 1, 2014

(65) Prior Publication Data

US 2016/0098940 A1   Apr. 7, 2016

(51) Int. Cl.
| | | |
|---|---|---|
| *G09B 15/00* | (2006.01) | |
| *G10H 7/00* | (2006.01) | |
| *G10H 1/40* | (2006.01) | |
| *G04F 5/02* | (2006.01) | |

(52) U.S. Cl.
CPC .............. *G09B 15/002* (2013.01); *G04F 5/02* (2013.01); *G04F 5/025* (2013.01); *G09B 15/00* (2013.01); *G10H 1/40* (2013.01); *G10H 7/00* (2013.01)

(58) Field of Classification Search
CPC ............ G10H 7/00; G10H 1/40; G04F 5/02; G04F 5/025
USPC .................................................. 84/484, 612
See application file for complete search history.

(56) References Cited

U.S. PATENT DOCUMENTS

| | | | | |
|---|---|---|---|---|
| 6,175,632 B1* | 1/2001 | Marx | ................... | H04R 29/008 381/56 |
| 8,604,327 B2* | 12/2013 | Takeda | ................. | G10H 1/0008 434/307 A |
| 8,856,641 B2* | 10/2014 | Pueyo | ................. | G06F 17/3082 348/460 |
| 2007/0089592 A1* | 4/2007 | Wilson | ...................... | G04F 5/02 84/612 |
| 2011/0028214 A1* | 2/2011 | Bright | ..................... | A63F 13/10 463/35 |
| 2011/0246186 A1* | 10/2011 | Takeda | ................. | G10H 1/0008 704/201 |
| 2014/0352521 A1* | 12/2014 | Takahashi | ............... | G04F 5/025 84/484 |

* cited by examiner

*Primary Examiner* — Elvin G Enad
*Assistant Examiner* — Christina Schreiber

(57) ABSTRACT

A computerized system and method for music practice and training to assist a musician to improve their skills in maintaining a tempo and to improve ear-hand coordination, eye-hand coordination and other motor skills while learning to play an instrument. The system receives user defined beats per minute (BPM), rhythms or short segments of a music piece and generates audio reference outputs and visual display of music notes as stimuli. The user responses to these stimuli are measured in time and in the force and intensity of the responses and provided as feedback to the user to improve their response time and intensity to stimuli and assists the user in modifying the responses to the output stimuli to reduce the time between the output stimuli and the user response and thus improve the user's timing accuracy while playing music.

19 Claims, 8 Drawing Sheets

RYTHMIC MOTOR SKILLS TRAINING DEVICE

FIELD OF THE INVENTION

The present invention is generally related to training musicians to maintain the proper beat while playing their musical instruments. More particularly, the invention relates to a system, method and device for training musicians to improve their rhythmic motor skills.

BACKGROUND OF THE INVENTION

The quality of a musical piece whether vocal or instrumental is determined by the ability to maintain a steady tempo or beat between musical notes. For some, including the great musicians of the past and present, the ability to maintain that beat has been and is an innate talent, while others have to be trained to acquire that talent.

Historically, the device used by musicians to maintain a steady beat and tempo while they play an instrument either alone or in a group, has been the, metronome which produces a metrical tick or clicking sound at a set rate of x number of clicks per minute. The timed clicks from the metronome helps musicians to maintain a steady beat as they play their instruments and/or help internalize a clear sense of timing and tempo. However, the free standing metronome commonly used to maintain tempo does not provide the musician with any feedback as to how close the musician is responding to the beat of the metronome, slightly ahead of the referenced beat or slightly after the beat.

With the advent of the personal computer (PC) followed by the personal digital assistants (PDA), digital tablets and smart phones (SP), music training has now entered the digital age and the once indispensable solitary free-standing metronome has in most instances, been replaced, by a computerized metronome with the beats emanating from within the PC, PDA, Tablet, or Smart phone to enable the musician to keep his tempo while playing his instrument.

The advent of the digitized metronome has made it possible to create music training applications and programs that are accessible on computers, tablets, smart phones and other smart devices. There is a need in the market for a music training product that is capable of providing feedback to the musician as to whether their response to a metronome beat is before, simultaneously, or after the beat and also one that improves their rhythmic motor skills such as ear-hand coordination, eye-hand coordination and other motor skills while learning to play an instrument. The present invention provides such a device, system and method. These and other features of the present invention will become obvious to one skilled in the art through the summary of the invention, detailed description of the invention, and the claims that follow.

SUMMARY OF THE INVENTION

The present invention is a computerized music training system and method to assist both a novice as well as a professional musician to improve their skills for maintaining a tempo while playing a musical instrument.

In an exemplary embodiment of the present invention, a user of the system inputs beats per minute (BPM), user defined rhythms and/or short segments of music pieces into the software program of the invention through a user interface on a personal computer (PC), laptop computer, personal digital assistant (PDA), digital tablet or smart phone (SP), or other smart devices (SD) which is then presented back to the user in the form of either audio and/or video stimuli. Once the user receives the audio or video stimuli, the user responds to them appropriately. The system of the invention then processes the user response and provides the user with a visual feedback in real time on the screen of the SD, showing the time it took the user to respond to the stimuli presented to the user. The data generated is stored and displayed as a statistic denoting the number of responses received within a user specified range of accuracy. The data is then analyzed and presented to the user to help the user improve their ear-hand coordination, eye-hand coordination and other motor skills while learning to play an instrument.

In yet another exemplary embodiment of the present invention, the system presents in real time, the strength, intensity and amplitude of the user response to an audio or video stimuli generated through the user inputs of beats per minute (BPM), defined rhythms and/or short segments of music pieces. The data generated is stored and displayed as a statistic denoting the number of responses received within a user specified range of accuracy and intensity. The data is then analyzed and presented to the user to help the user improve ear-hand coordination, eye-hand coordination and other motor skills while learning to play an instrument.

The foregoing summary of the embodiments of the present invention should not be construed to limit the scope of the invention. In this summary of the invention and in the specification in general the various references to "the exemplary embodiment," "an exemplary embodiment," "related embodiment", "yet another embodiment," and "other embodiments" do not necessarily refer to the same embodiment (s). Rather, these references to the various embodiments in general mean that a particular feature, structure, or characteristic described in conjunction with an embodiment is included in at least some embodiments, but not necessarily all embodiments of the invention. The objects, embodiments, and features of the present invention as described in this summary of the invention will be further appreciated and will become obvious to one skilled in the art when viewed in conjunction with the accompanying drawings, detailed description of the invention, and the appended claims.

DETAILED DESCRIPTION OF THE INVENTION

The present invention is a system, method and device for assisting a musician to determine their timing accuracy in maintaining a tempo/beat when playing a piece of music on an instrument either by themselves or in a group, thereby training the musician to maintain the proper tempo while playing the music. Besides maintaining tempo, the present invention also improves rhythmic motor skills such as ear-hand coordination, eye-hand coordination and other motor skills of musicians while learning to play an instrument.

The exemplary embodiments of the invention use a processor, computer-readable memory, a non-transitory computer-readable storage device, head set jacks, speaker, microphone and touch screen display which are all components found in personal computers (PC's), personal digital assistants (PDA's), Tablets and Smart phones (SP's), collectively referred herein as Smart devices (SD's). In the embodiments of the invention, the Smart device (SD) is programmed with executable software of the invention capable of accepting the user's input parameters for use in setting up and executing the reference patterns driving the audio and visual outputs.

In all embodiments of the present invention, the Smart device (SD) first receives inputs from the user such as beats per minute (BPM), defined rhythms, or short segments of a music piece in response to which, the SD generates audio outputs and visual reference stimuli based on the user inputs. The user then provides the appropriate responses to the stimuli presented to them within a time frame. The SD computes the time difference between the audio and/or video outputs and the user responses to them and displays the time difference between the two actions, as feedback to the user. The feedback thus received from the SD assists the user in modifying the responses to the output stimuli to reduce the time between the output stimuli and the user response and thus improving the user's timing accuracy while playing music.

Figure 1:
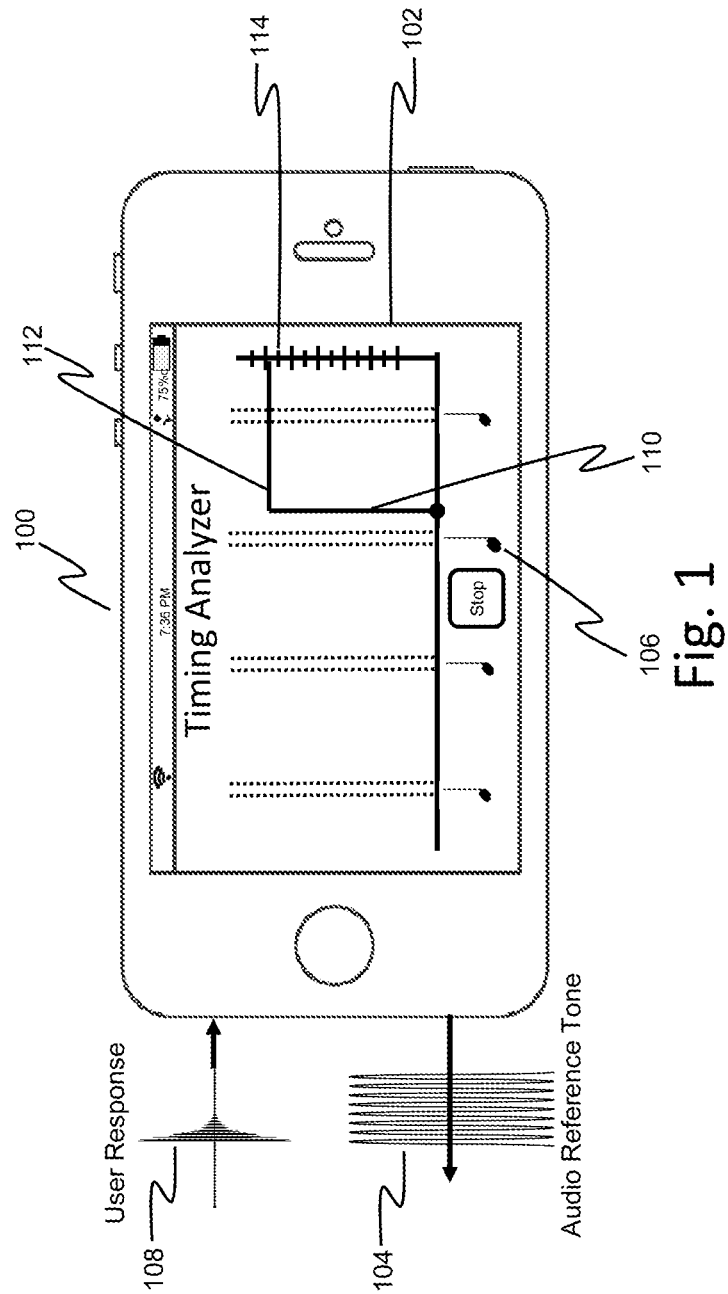
FIG. 1 is a perspective view of the implementation of the invention on a Smart device (SD) such as a smart phone (SP).

Referring now to the figures, more particularly, FIG. 1 the figure is a perspective view of the implementation of the present invention on a Smart device (SD) 100 such as a Smart phone (SP). The SD 100 shows a user interface with a screen shot of a timing analyzer 102 incorporated within the software of the invention. In the embodiments of the invention, the user inputs, beats per minute, defined rhythms and/or short segments of music pieces into the timing analyzer 102 through the touch screen window of the SD 100. When the timing analyzer 102 of the invention receives the user inputs, the system outputs an audio reference tone 104 concomitantly with a video display of a quarter music note 106 as stimuli indicating to the user where precisely in the practice pattern, the audio reference tone 104 occurred. The user then responds by striking a pad, striking a table top, snapping their fingers, calling out numbers such as, a-one, a two, a three etc., stomping their foot, or using other objects to produce a noise in response to the stimuli which is recorded as the user response 108 to the audio reference tone 104. The system of the invention uses noise filters and threshold level triggers to accurately identify a valid user response 108 to the audio reference tone 104. The SD 100 displays the user response as 110 to the user indicating the time between the output quarter note 106 and the user response 110. The time interval between the output quarter note 106 and the user response 110 is stored in the memory of the system. In some instances, the user may anticipate the audio reference tone 104 and in those instances, the SD 100 would display the user response 110 to the left of the reference note 106. In this Figure, the vector 112 on the screen shot 102 indicates to the user, the intensity of the user response 110 on a scale 114 and stores this user response 110 intensity value in the memory of the system.

In this embodiment of the invention, the system of the invention within the SD 100 keeps track of the time from the output reference tone 104 to the speaker of the SD 100 and the display of the user response 110. The SD 100 stores the data to be used to notify the user via audio and video signals indicating the degree of separation between the audio and display reference output in real time and saving the results for future data reports requested by the user.

Figure 2:
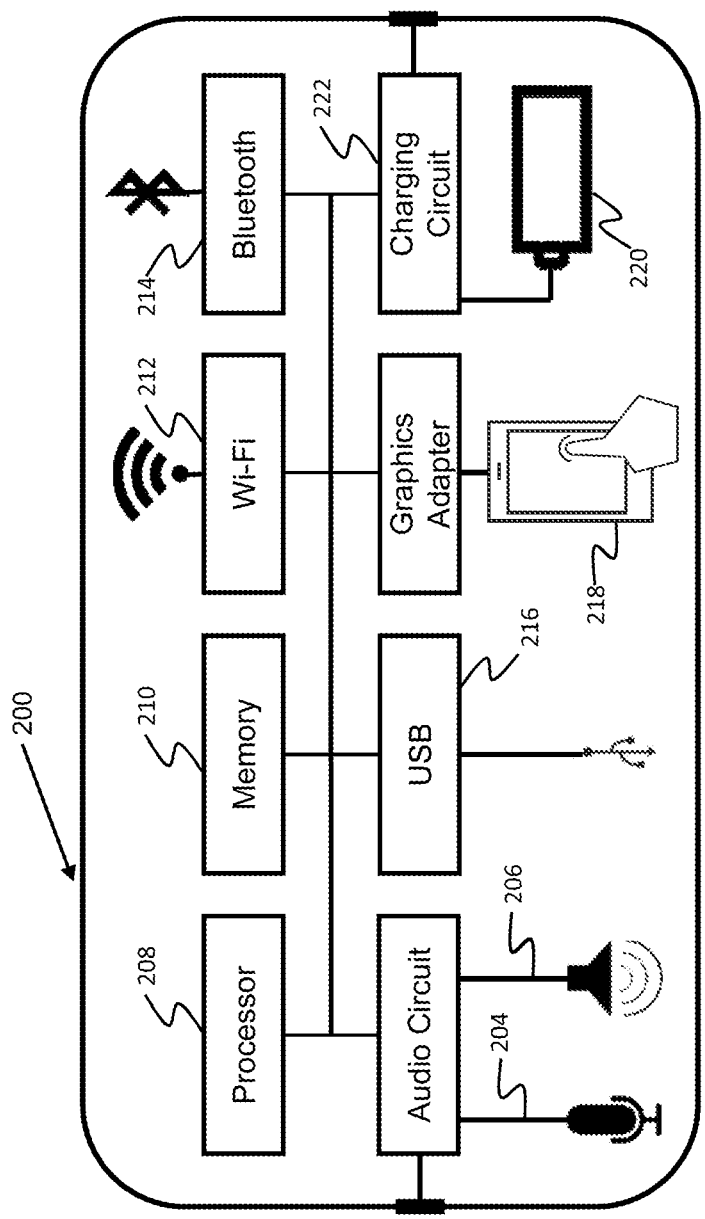
FIG. 2 is a perspective view of the smart device (SD) components used to implement the invention.

FIG. 2 is a perspective view of the smart device (SD) components used to implement the present invention. The system requires a battery powered SD 200 comprising a microphone 204, speaker 206, processor 208, memory 210, internet connectivity (WiFi) 212, Bluetooth connectivity 214, Universal Serial Bus (USB) interface 216, touch screen display 218, rechargeable battery 220, charging circuit 222 and a software operating system (OS). It is well known in the art and to one skilled in the art that the referenced, memory 210, Wifi 212, Bluetooth connectivity 214, charging circuit 222, USB interface 216 and the other features are integrated into a single micro circuit generally referred to as a microcontroller, single chip computer, or in other ways. When the SD 200 is powered on, the home screen including the present invention icon will be displayed. In another embodiment of the invention, there would be a dedicated solution directed to the invention's home screen when the SD 200 is powered on.

Figure 3:
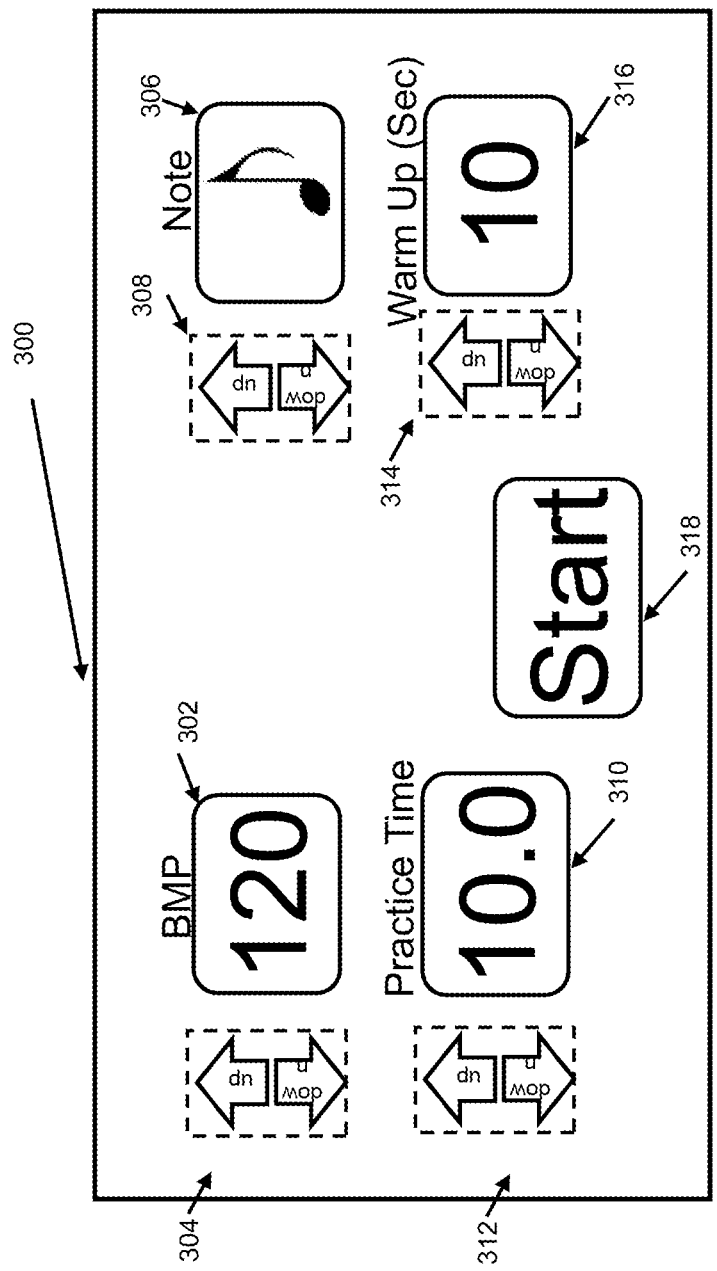
FIG. 3 shows the graphical user interface on the touch screen display of a smart device (SD) for user input of parameters.

FIG. 3 shows the graphical user interface (TGUI) 300 on the touch screen display 218 of a smart device (SD) 200 as shown in FIG. 2 for user input of parameters in the exemplary embodiment of the present invention. The user is invited to accept the default beats per minute (BPM) value 302 or change the value to 304 using the up/down arrow; accept the default note 306 or change it to the note 308; accept the practice time 310 or change it to the practice time 312; accept the warm-up time in seconds 316 or change it to warm-up time in seconds 314. The SD processor 208 described in FIG. 2 monitors the TGUI 300 on the touch screen display 218 inputs until the start button 318 is touched at which point, the processor 208 advances to run the application. In this embodiment of the invention, the note value in general whether it is the default note value 306 or the changed note value 308 indicates the duration of a tone for a given BPM as for example, a half note has two equally spaced durations, a quarter note, four equally spaced durations, an eight note, eight equally spaced durations, a sixteenth note, sixteen equally spaced durations and a thirty second note, thirty two equally spaced durations during a BPM period. Additionally, the user interface can accept a combination of notes and corresponding rests as well as triplets and tuplets found in music pieces. A whole note duration is the BPM period, or in other words, the SD will output a single audio tone at the BPM frequency 302. The SD will output a tone at the beginning edge of the note duration for the other notes (½, ¼, ⅛, ¹⁄₁₆ & ¹⁄₃₂) with the first tone accented in volume or pitch to indicate to the user the beginning of a measure (measure is the time between two BPMs). Another input screen would guide the user through setting up a practice session with a variety of notes over several bars. Also, templates can be sent to the SD via the Internet, Bluetooth or added through external memory. The invention reads the screen resolution from the operating system (OS) and computes a screen border and the placement of the notes as well as the user setup parameters on the touch screen display 218.

Figure 4:
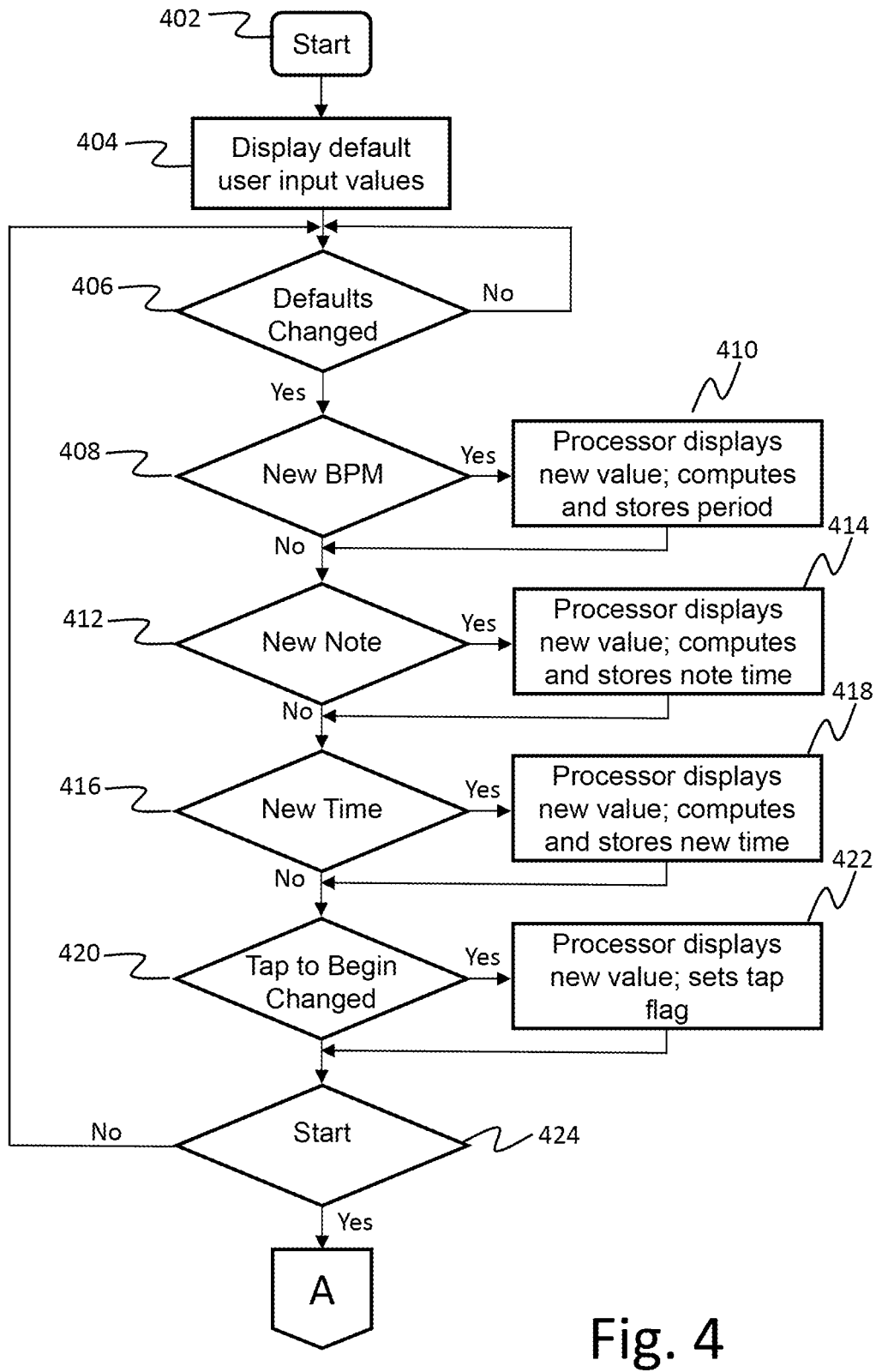
FIG. 4 is a flow diagram of the graphical interface shown in FIG. 3 with an invitation to the user to modify the default parameters.

FIG. 4 is a flow diagram of the graphical interface shown in FIG. 3. The process starts with an invitation to the user to modify the default parameters. The processor 208 shown in FIG. 2 presents an initial start step 402 and then displays the default user input values step 404. The user then has the option to change the default user input values and if they decide to change the default values and tap on the touch screen display 218 to indicate that, then the processor 208 moves to the next step 406 which starts the process of changing the default values. If the change in the default value is a change in the beats per minute (BPM), the user makes the change in step 408 and the processor 208 displays the new BPM value in box 410 and computes and stores that value. In the next step, 412 the user makes a change in the default note and the processor 208 displays the new note value in the box 414 and computes and stores the new note value and also the note time. In the next step 416 the user changes the default time to a new time and the processor 208 computes the new time and displays and stores it in box 418. In the next step 420 the user taps the touch screen display 218 to begin the default value changes and the processor 208 displays the new values and sets a tap flag in box 422. After all the changes are made, the user arrives at the last step which is the start step 424 where the user can tap the start button 318 illustrated in FIG. 3 to start the application. In this embodiment of the invention, if the user accepts the default user input values at step 404 the user can bypass the default change steps and go directly to the start step 424 and tap the start button 318 to start the application. If at the end of the process, the user did not tap the start button 318 the processor 208 returns to step 406 waiting to receive a user input.

Figure 5:
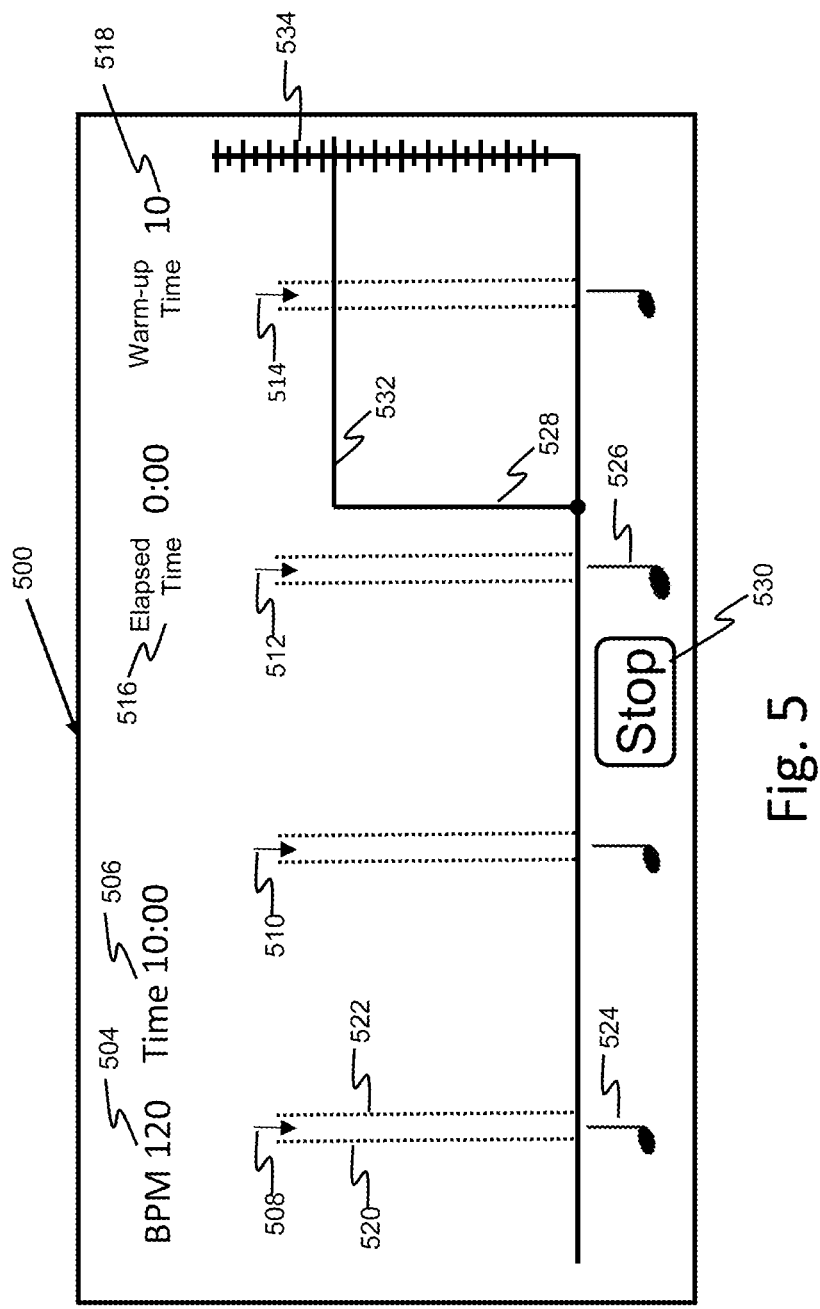
FIG. 5 illustrates the practice screen on the user interface indicating the position of the various parameters and the results of the user response to the user inputs.

FIG. 5 illustrates the practice screen on the user interface indicating the position of the various parameters and the results of the user response to the user inputs. When the user taps the touch screen display 218 described in FIG. 2 after entering the default values or changed values, a screen 500 appears which shows the user input values for BPM 504 and a session time 506. The particular screen 500 shown in FIG. 5 shows a practice display computed for a user input of a quarter note. The display screen has the beginning of a bar (measure) starting on the left of the screen 508 and is read left to right as would be read on sheet music. Beat reference stimulus occurs at 508 and is the first quarter note in the bar followed left to right by quarter notes 510, 512, and 514 repeating the sequence until the elapsed time 516 is equal to the user input time 506 or the user touches the stop button 530. Warm-up time 518 provides the user time to get familiar with the tempo of the practice template before the processor starts recording the accuracy results. Each note has a target area indicating to the user an acceptable accuracy. The target area is defined by hash lines 520 and 522 showing an area indicating a time window starting before (early) and lasting after (late) reference audio and visual stimuli. The target area is identified for each note 510, 512, 514 in the bar. The note image 524 indicates which note in the bar is processed and is producing a stimulus for a user response. For example, note 526 flashes, changes color, or indicates to the user visually, the note sequence in the bar for the user's reference.

In this embodiment of the present invention, the processor receives the user response 108 input illustrated in FIG. 1 from the microphone 204 shown in FIG. 2 and displays a vertical marker 528 indicating to the user where the response is in relationship to the stimulus. The force, intensity and amplitude of the user response are displayed in the vertical marker 528. The vertical marker 528 to reference note 526 indicates to the user, the response is late relative to the reference stimulus. The horizontal line 532 connected to the vertical marker 528 rises and falls with the force computed for the user response. The relative force, intensity and amplitude measured at the intersection of the vertical marker 528 and the horizontal line 532 is measured on the scale 534.

Figure 6A:
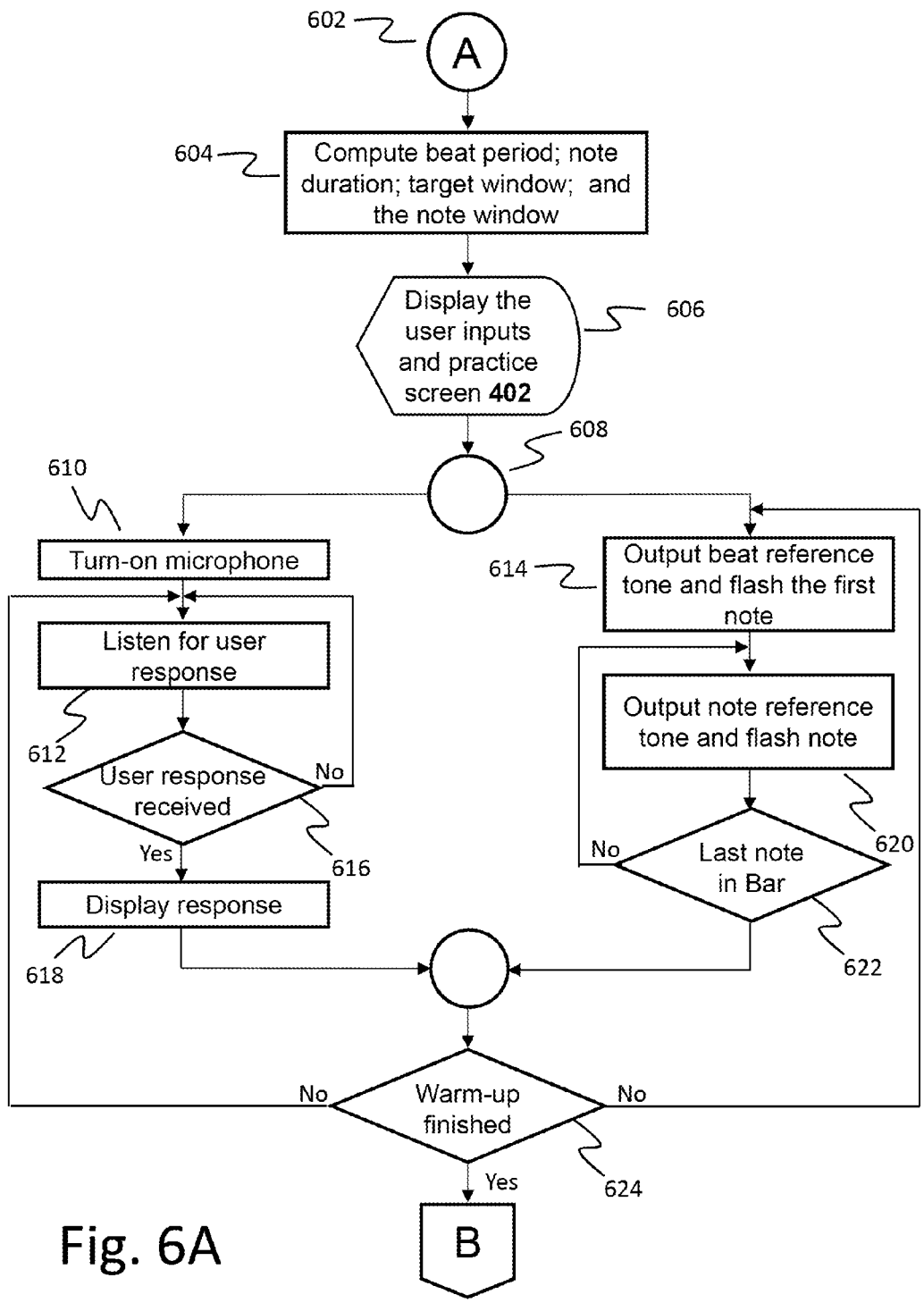
FIG. 6A is a flow diagram of the graphical interface shown in FIG. 5.

FIG. 6A is a flow diagram of the graphical interface shown in FIG. 5. After setting up the practice session as described through FIG. 3 the application starting at step 602 in this flow diagram moves down to step 604 to compute the basic parameters needed to display the screen image 606 on the touch screen display 218 described in FIG. 2. In this flow diagram, at step 608 the processor 208 introduces multitasking by turning on the microphone 610 and listening to a user input response 612 to the output beat reference 614. The processor 208 receives a response 616 and displays the response as 618 on the touch screen display 218. This response is recorded through the vertical marker 528 and the horizontal line 532 as shown and described in FIG. 5. In steps 614 to 620 the processor 208 computes the next note time by adding the note duration value to the last output tone time. The processor 208 cycles through steps 620 and 622 outputting a reference tone and displays a reference marker until the last note 622 in the bar is processed. For example, using a quarter note input 306 as described in FIG. 3 and a BMP value of 302, the system would process and output three notes in addition to the beat reference 614. In this example, the duration for a note would be one-eighth of a second and the beat period would be one-half second. Given the beat reference at time zero, the next note is output at time one-eight second, the third note is output at time one-quarter second and the last note in the bar is at three-eighths of second at which time the last note 622 would be detected and the processor 208 would move to step 624 and then return to 614 to start a new bar one-half second after the preceding bar if the warm-up 316 time shown in FIG. 3 had not elapsed. In the event the warm-up time 316 had elapsed, the processor 208 would move to FIG. 6B step 630 to start the Practice Session.

Figure 6B:
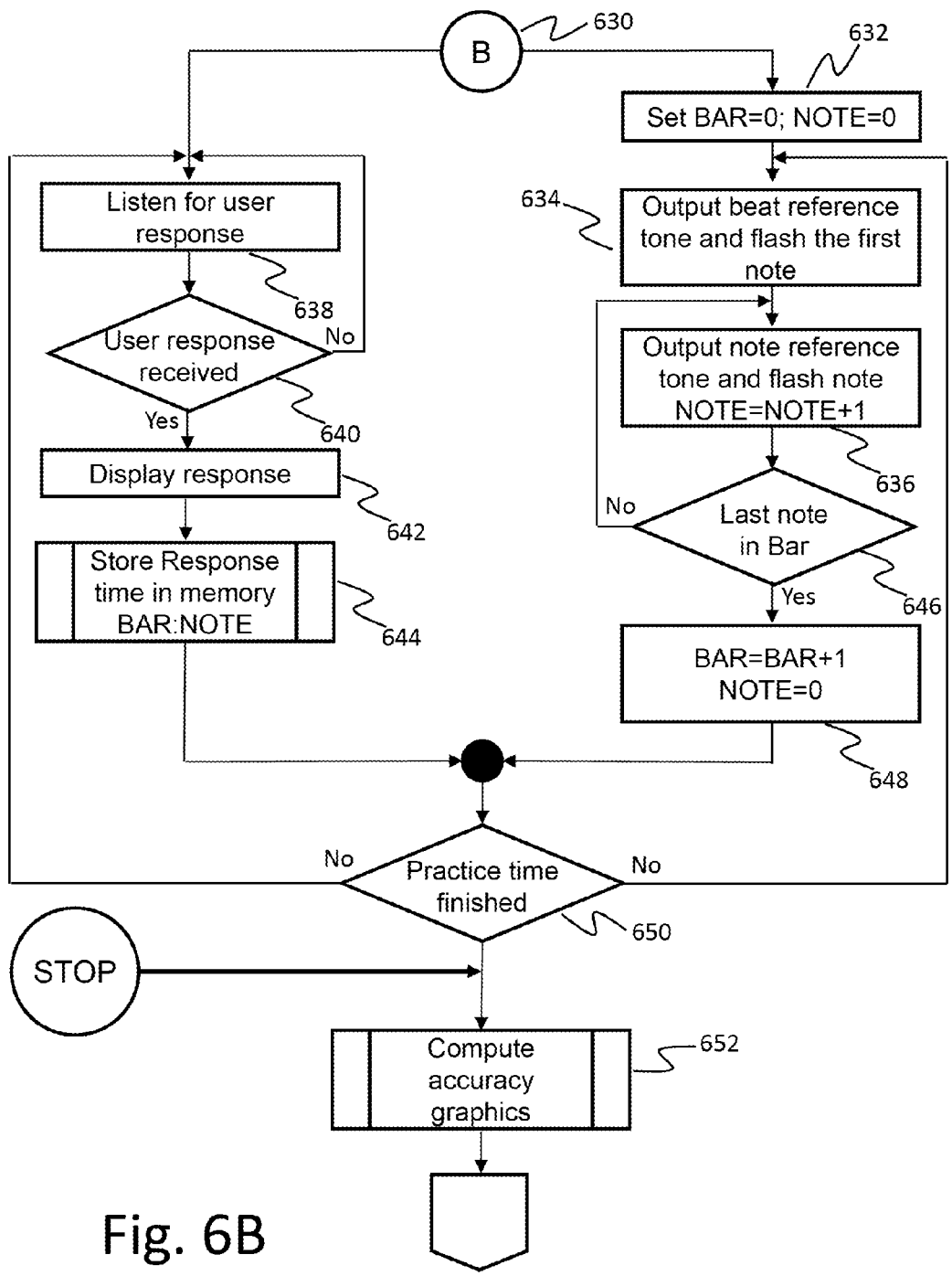
FIG. 6B is a flow diagram showing the processing of the user responses to the user inputs and storing the user responses in the smart device memory.

FIG. 6B is a flow diagram showing the processing of the user responses to the user inputs and storing the user responses in the smart device (SD) memory. Entry into the practice session at step 630 sets the address parameters BAR and NOTE to zero at step 632 and the processor 208 outputs the beat reference tone and displays a reference marker at step 634. Microphone 204 described in FIG. 2 is on and the processor 208 is listening to a user response in step 638 while concurrently executing step 634 and step 636 to output the second note and increment NOTE to NOTE plus one. The notes in the bar are processed in step 636 and the processor 208 checks for the last note in the bar at step 646. A last note detected moves the processor 208 to step 648 and increments the BAR memory parameter to BAR plus one. The processor 208 then proceeds to step 650 and if the practice time has not elapsed, the processor 208 returns to step 634 and repeats the execution.

Referring again to FIG. 6B when the user response is received in step 640 shown on the left hand side of the flow chart in FIG. 6B the processor 208 moves down to step 642 displaying the response on the screen 500 through the vertical marker 528 and the horizontal line 532 as described in FIG. 5. The processor 208 then moves down to step 644 and stores the time the user response was received by the processor 208 in memory 210 of the SD 200. This user response is computed and stored along with the intensity, force and amplitude of the response in memory 210. The processor 208 continues executing the software in step 636 in increments of NOTE to NOTE plus one. At step 646, the processor 208 checks if the operation is the last note in the bar and if not, the processor 208 returns to step 636 and repeats the process of outputting a reference tone while listening for a user response. Once the last note in the bar is processed at step 648 the processor 208 moves to step 650 which is the end of practice time and determines if the practice time has expired, and if so, moves down to the last step 652 to compute accuracy graphics.

Figure 7:
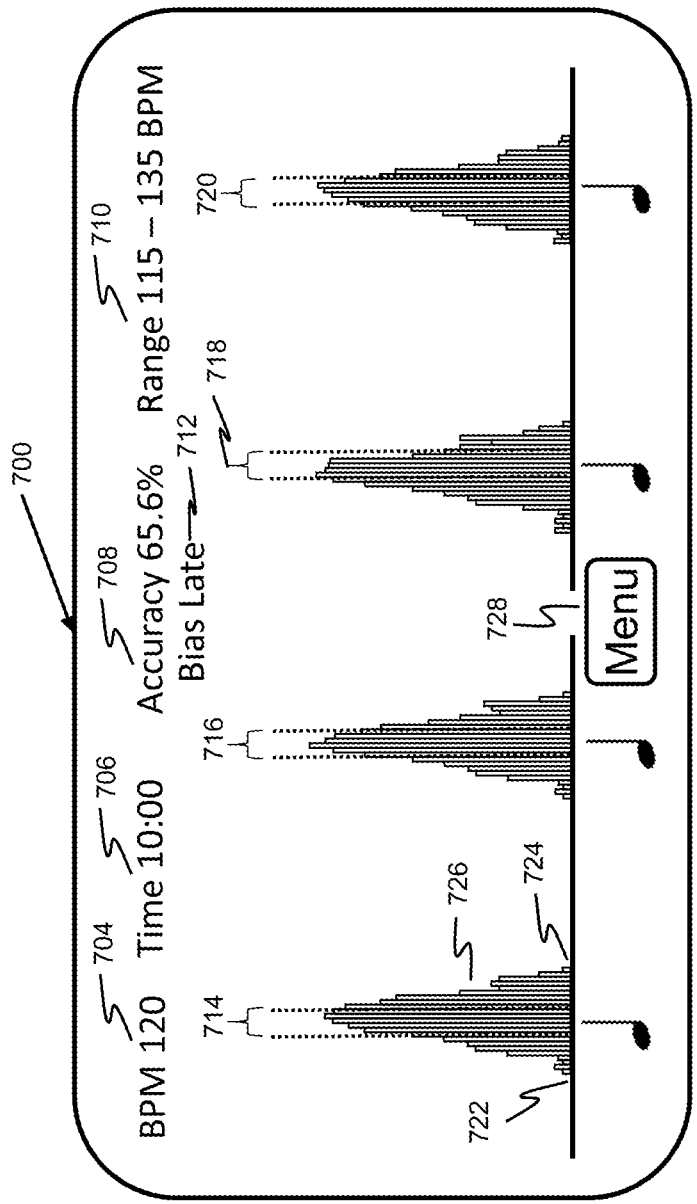
FIG. 7 shows the graphic interface screen with the summary of the practice session and the termination of the session.

FIG. 7 shows the graphic interface screen with the summary and results of the practice session and the termination of the session. The image presented to the user is similar to the image 500 in FIG. 5 shown here, as the user input BPM 704 and the actual time 706 the user used the invention during the practice session which could be the user input practice time 310 as described in FIG. 3 or the elapsed time when the stop button 530 was pressed or tapped. The user responses to the reference stimuli are stored in memory for analysis and presented to the user 700. Accuracy 708 is the number of responses falling within the target area indicated by the dashed vertical lines 714, 716, 718 and 720 divided by all of the responses processed by processor 208 and presented to the user as a percentage. Range 710 indicates to the user the variance in BPM computed by the invention by using the early 722 and late 724 times and computing a BPM for each. Bias 712 late or early is the analysis of all of the responses indicating the user responses tending to be early, before the reference stimulus, or late, after the reference stimulus. The invention computes and presents graphics to a user indicating the distribution of the user responses around the reference stimulus as indicated with bar graphics 726. The bar graphs show the number of responses falling within a specific period around the stimulus.

The present invention when used on any smart device (SD) platform can be programmed to present many different analysis and presentation of the data. The Menu button 728 can be used to add additional features to the application in analyzing and presenting the data to the user. Also, data stored by the invention in the SD can be uploaded to a central server via the internet. Software updates, changes, features can be downloaded to the SD via internet.

The foregoing detailed description of the present invention through its figures and exemplary embodiment should not be construed to limit the scope of the invention. It should be understood that the phraseology and terminology used to describe the various parts of the invention are for descriptive purposes only and other phrases and terminology may be used to describe the relevant parts of the invention without departing from the scope of the invention. It should be further understood and obvious to those skilled in the art that alternatives, modifications and variations of the embodiments of the invention described herein are within the spirit and scope of the appended claims.

What is claimed is:

1. A system and method for computing a difference in response time between a system generated stimuli to a user input and a user response to said stimuli and displaying said difference in response time of said user to said stimuli, on an electronic device:

user input of beats per minute, defined rhythms, short segments of music pieces into a timing analyzer in said electronic device to generate said stimuli;

said timing analyzer outputting an audio reference tone of said system generated stimuli through a speaker on said electronic device;

said timing analyzer outputting a video reference display of a quarter music note of said system generated stimuli on a touch screen display window of said electronic device simultaneously with said output of said audio reference tone through said speaker of said electronic device;

said user responding to said audio reference tone and said video reference display through user generated noise;

said timing analyzer computing a relative difference in time between said system generated stimuli and said user response; and displaying said relative difference in time between said system generated stimuli and said user response on said touch screen display window of said electronic device.

2. The system and method of claim 1, wherein a relative difference in response time between the system generated stimuli and user response comprises determining a time when the user response was received in relation to a time the output stimulus activated the speaker on the electronic device and displayed the difference in time through a reference time marker on the touch screen display window of said electronic device.

3. The system and method of claim 2, wherein displaying the relative difference in response time between the system generated stimuli and user response through a reference time marker comprises, displaying a vector to a left of said reference time marker indicating an early response to said output stimulus and displaying a vector to a right of said reference time marker indicating a late response to said output stimulus.

4. The system and method of claim 1, wherein a relative difference in an intensity and an amplitude of the user response to a system generated stimuli is displayed as a vertical marker on the touch screen window display of said electronic device.

5. The system and method of claim 4 wherein a plurality of the said intensity and said amplitude of the user response to a system generated stimuli are stored in a memory of said electronic device.

6. The system and method of claim 1, wherein user input of said beats per minute, defined rhythms, short segments of music is through a user contact with said touch screen display window on said electronic device.

7. The system and method of claim 1, wherein providing output stimulus further comprises audio reference stimulus produced from said electronic device speaker and simultaneously displaying a reference marker on the touch screen display window of said electronic device.

8. The system and method of claim 1, wherein an audio input of said user response as user generated noise is processed through an embedded microphone in said electronic device.

9. The system and method of claim 1, wherein plurality of the relative difference in time between said system generated stimuli and user response to said stimuli are stored in a memory of said electronic device.

10. The system and method of claim 1 wherein data generated of the user response time to a system generated stimulus is displayed to the user as a statistic denoting the number of responses received within a user specified range of accuracy and intensity.

11. The system and method of claim 1 wherein data generated of the user response time to a system generated stimulus is analyzed and displayed to the user on the electronic device to help the user improve ear-hand coordination, eye-hand coordination and related motor skills while learning to play an instrument.

12. A processor having a computer program product for directing a user interaction with an audio and a video stimuli generated on an electronic device, said computer program product comprising a computer readable medium having executable program instructions to:
   a) invite a user to change program variables on a touch screen window display of said electronic device;
   b) use said program variables to determine an audio output to a speaker and simultaneously presenting a reference marker on said touch screen window display of said electronic device;
   c) alter an input mode capability of said electronic device responsive to user response received by a microphone on said electronic device;
   d) determine a relative difference between an output stimulus and said user response; and
   e) present a relative difference between an output stimulus and a user response to said output stimulus as a vertical line on said touch screen window display of said electronic device placed to a right of said reference marker for responses received after said output stimulus and to a left of said reference marker for responses received before said output stimulus.

13. The processor having a computer program product of claim 12 wherein said computer readable medium has executable program instructions to determine an amplitude value of a user response to said output stimulus.

14. The processor having a computer program product of claim 13 wherein said amplitude value of a user response to said output stimulus is stored in a memory of the processor.

15. The processor having a computer program product of claim 12 wherein the computer readable medium modulates said relative difference between an output-stimulus and a user response to said output stimulus as said vertical line proportional to said amplitude value and displays it on the touch screen window display of the electronic device.

16. An electronic device with provision for measuring a user's interaction with a user defined audio and/or visual stimulus, comprising:
   a processor;
   a memory operably connected to said processor and having encoded thereon program instructions, including:
   program instructions for receiving user inputs invited by a menu presented on a touch screen window display of said electronic device;
   program instructions for determining an audio and a video stimulus presented to said user;
   program instructions for determining a user input from a microphone in response to said audio and video stimulus;
   program instructions for determining a relative difference in time between said audio stimulus and user response to said stimulus;
   program instructions for determining an amplitude of said user response to said audio and video stimulus;
   program instructions for displaying said relative difference in time between said video stimulus and user response to said stimulus; and
   program instructions for displaying said amplitude of said user response to said audio and video stimulus.

17. The device of claim 16 wherein program instructions store relative difference in time values of said user response to said audio and said video stimuli, in said memory of said electronic device.

18. The device of claim 16 wherein the amplitude of the user input modulates the displayed relative difference in time between the audio and video stimulus and the user response to the stimulus.

19. The device of claim 16 wherein program instructions store the amplitude values of the user response to said audio and said video stimuli in said memory of said electronic device.

* * * * *